(12) United States Patent
Becker et al.

(10) Patent No.: US 7,688,197 B2
(45) Date of Patent: Mar. 30, 2010

(54) SYSTEM FOR IDENTIFYING AN UNAUTHORIZED USE OF A TELEMATIC DEVICE

(75) Inventors: Michael Becker, Philippsburg (DE); Dirk Lappe, Schilling-von-Canstatt-Strasse (DE); Arnold Gieseke, Giesen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 493 days.

(21) Appl. No.: 10/506,092

(22) PCT Filed: Feb. 27, 2003

(86) PCT No.: PCT/EP03/02030

§ 371 (c)(1), (2), (4) Date: Jun. 3, 2005

(87) PCT Pub. No.: WO03/072404

PCT Pub. Date: Sep. 4, 2003

(65) Prior Publication Data
US 2005/0206509 A1    Sep. 22, 2005

(30) Foreign Application Priority Data
Feb. 27, 2002   (DE) ............................... 102 08 522

(51) Int. Cl.
*H04Q 7/00* (2006.01)
(52) U.S. Cl. ............ 340/539.13; 340/571; 340/426.19; 379/59; 455/33.1
(58) Field of Classification Search ................ 340/988, 340/992, 5.3, 991, 426.1, 426.12, 571, 457, 340/539.13, 5.61, 5.65; 455/456.1–456.6
See application file for complete search history.

(56) References Cited

U.S. PATENT DOCUMENTS

| 5,515,426 | A | * | 5/1996 | Yacenda et al. | ........ 379/201.07 |
|---|---|---|---|---|---|
| 5,715,903 | A | * | 2/1998 | Summers et al. | ............ 180/219 |
| 5,715,905 | A | * | 2/1998 | Kaman | ........................ 180/287 |
| 5,731,785 | A | * | 3/1998 | Lemelson et al. | ...... 342/357.07 |
| 5,765,105 | A | * | 6/1998 | Kuriki | .......................... 455/410 |
| 6,070,076 | A | * | 5/2000 | Valentine | ..................... 455/445 |
| 6,244,758 | B1 | * | 6/2001 | Solymar et al. | ............. 709/224 |
| 6,282,491 | B1 | * | 8/2001 | Bochmann et al. | .......... 701/209 |
| 6,433,685 | B1 | * | 8/2002 | Struble et al. | ................ 340/571 |

(Continued)

FOREIGN PATENT DOCUMENTS

DE        42 39 271 A1    10/1993

(Continued)

OTHER PUBLICATIONS

Data Communication System for Automatic Vehicle Identification, Apr. 1, 1994, IBM Technical Disclosure Bulletin, vol. 37, Issue No. 4B, pp. 235-238.*

*Primary Examiner*—Brian A Zimmerman
*Assistant Examiner*—Yong Hang Jiang

(57) ABSTRACT

The invention relates to a system of identifying an unauthorized use of a telematic device or a vehicle equipped with a telematic device. The telematic device includes an identification code, which is transmitted to a service provider. The identification codes of those telematic devices, which have been reported as being used in unauthorized, are stored at the service provider. The identification codes received at the service provider is compared for a match with the stored identification codes.

33 Claims, 2 Drawing Sheets

U.S. PATENT DOCUMENTS 6,614,350 B1 * 9/2003 Lunsford et al. ......... 340/572.1

FOREIGN PATENT DOCUMENTS

| | | |
|---|---|---|
| DE | 43 40 138 A1 | 6/1995 |
| DE | 296 24 363 U1 | 11/1996 |
| DE | 197 33 579 A1 | 2/1999 |
| WO | WO 97/120714 | 6/1997 |
| WO | WO 00/45243 | 8/2000 |

* cited by examiner

US 7,688,197 B2

SYSTEM FOR IDENTIFYING AN UNAUTHORIZED USE OF A TELEMATIC DEVICE

PRIORITY CLAIM

This application claims the benefit of PCT Patent Application International Application No. PCT/EP03/02030, filed Feb. 27, 2003, which claims priority to German Patent Application No. 102 08 522.8, filed Feb. 27, 2002. The disclosure of the above applications is incorporated herein by reference.

BACKGROUND OF THE INVENTION

1. Technical Field

This invention relates to a method and system for identifying an unauthorized use of a telematic device or a vehicle equipped therewith. Further, this invention relates to a telematic device for use in such system.

2. Related Art

Nowadays, vehicles are more and more equipped with a telematic device, which is commonly understood as a device that integrates a vehicle information and entertainment system with a telecommunication device, such as a mobile telephone unit and a navigation device for providing position and route data. The telematic device usually comprises tuning receivers for radio programs or television programs. Video programs on demand can also be received by a technique called "streaming" involving the telecommunication unit.

A telematic device has a considerable value in the vehicle and is therefore frequently subject to thefts. Equally, vehicles of upper class are more and more equipped with such telematic devices and consequently are often used in an unauthorized manner or even stolen. Consequently, various systems have been proposed for surveillance of vehicles and systems for detecting an unauthorized use of vehicles.

For instance, DE 296 24 363 U1 describes a system for locating stolen vehicles using a satellite system for receiving and transmitting data relating to the vehicle's identification code. To this end, the vehicle is equipped with a decodable microchip having stored data relating to the vehicle's identification. The microchip can be activated by signals from the satellite and in response thereto transmits a signal including position data to the satellite for relaying same to a central surveillance station. The system is therefore independent from a cellular radio communications network and is thereby not only locally effective, but also globally in foreign countries outside the coverage of a standardized communications system.

From WO 97/20714, a system for guarding a vehicle from a distance consisting of an alarm system in a vehicle is known. The alarm system is connected to a transmitter and furthermore to a global positioning system GPS navigation system provided in the vehicle. When the alarm system is triggered by an attempt to break into the vehicle or to steal the vehicle, the alarm system generates an alarm signal, which is sent by the transmitter and subsequently to a central surveillance station. Simultaneously, also the position of the vehicle is transmitted to the surveillance station, such that it is possible to direct police or other security services to the location of the stolen vehicle.

From DE 197 33 579 A1, a mobile unit comprising a receiver for a satellite navigation system and a radio modem for transmitting position data in a radio communications network is known. A mobile unit is fixed in a manner to the vehicle, such that it is not immediately apparent for the user of the vehicle. When the vehicle is in use, the mobile unit sends control data in a cyclic manner in order to prevent power consumption from the battery, which could be suspicious to the user.

From the DE 43 40 138 A1, an arrangement of a GPS unit for determining position coordinates of a vehicle connected to a mobile radio unit working within a standardized communication network is known. This is useful for transmitting the vehicle identity number to a telephone network station, which can be connected to a central unit for locating the position of the vehicle reported to be stolen.

Although the prior art systems work well for protecting and locating vehicles, there is no effective protection against a valuable device, such as a telematic device, which due to its inherent value is frequently subject to theft. Although there are known security codes in connection with radio receivers, which need to be inputted after an interruption of the power supply or security cards, which must be inserted into the device before operation thereof, such codes are frequently broken by professional by code-breaking devices.

Consequently, it would be desirable to have an effective protection against unauthorized use of a telematic device. The object of the present invention is to overcome the shortcomings of the prior art described above.

SUMMARY

The invention relates to storing identification codes of those telematic devices, which have been reported as being used unauthorized, at a service provider. Further, identification codes, which are received at the service provider are compared for a match with the stored identification codes. In this manner, it is easily possible to detect an unauthorized use of the telematic device. Even more importantly, the user does not necessarily become aware of the fact that the unauthorized use has been detected. This is because the transmission of the identification code is included in ordinary routines, e.g. when requesting online services. Consequently, even if the telematic device is manipulated, e.g. by removal of the security module or changing the identity card, the unauthorized use will become detectable by the unique identification code of the telematic device.

The service provider may request the transmission of the present position coordinates of the telematic device when a match is found. This facilitates determining the location at which the telematic device or vehicle being used in an unauthorized manner is located.

The position coordinates are determined using a global positioning satellite (GPS) module comprised in the telematic device. According to this preferred embodiment, a standard module can be employed without additional hardware and costs.

According to a further advantageous, the communication between the telematic device and the service provider is carried out without using a standard cellular radio communication system. Such communication systems have found widespread use with almost all areas being covered with reasonable costs. According to this embodiment, it is not necessary to provide a customized radio communication system solely for surveillance purposes.

The identification code is transmitted to the service provider in cyclic intervals, preferably, once per day, even if no online services are requested during its interval. Accordingly, an unauthorized use can be very quickly detected even if the telematic device is not put into operation for several days.

In order to allow additional flexibility, the cyclic transmission of the identification code is according to a further preferred embodiment, disabled and enabled upon input of a security code into the telematic device.

The steps are carried out by an automatic routine without requiring interaction by the user. In this way, the unauthorized use can be determined without the user being aware that a determination of unauthorized use has already been made.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
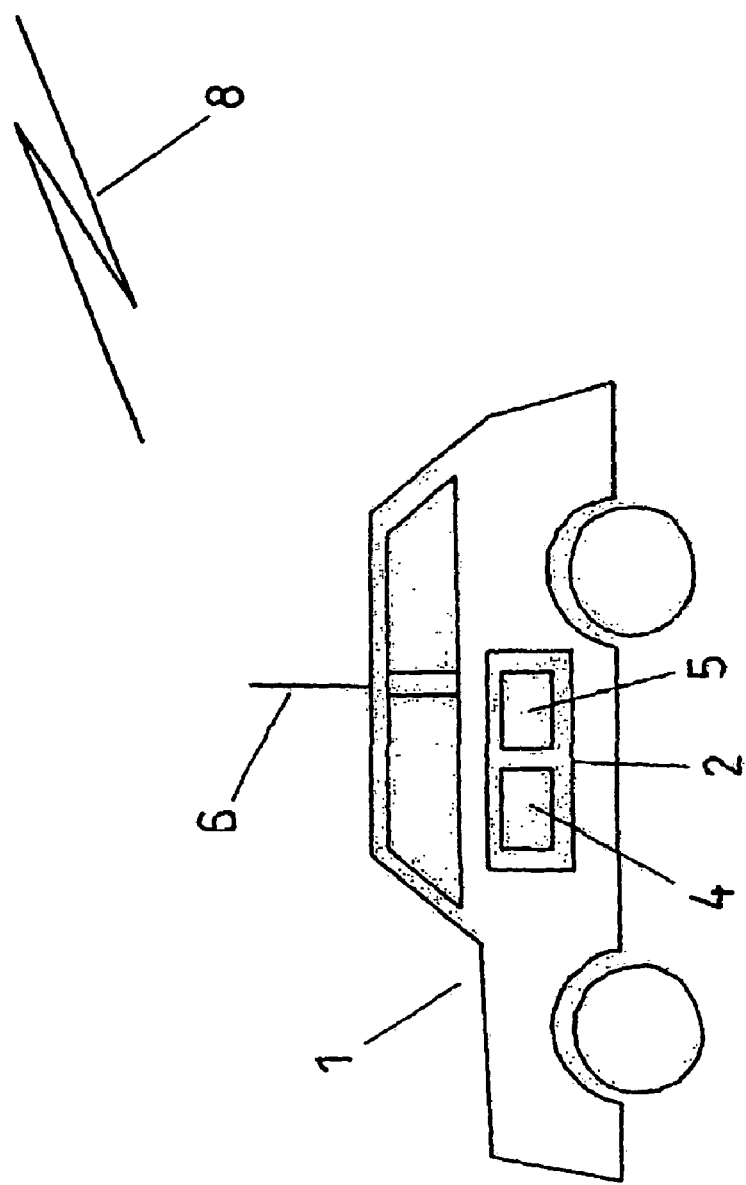
FIG. 1 a system according to the present invention, for identifying an unauthorized use of a telematic device or a vehicle equipped therewith.

FIG. 1 shows a vehicle 1 comprising a telematic device 2 comprising a GPS module 4 and a mobile telecommunication unit 5. As mentioned before, the term telematics refers to the emerging market for in-vehicle communications that combines wireless voice and data transfer with GPS positioning technology to provide location-based connectivity, security information and entertainment services. Typically, a telematic device also includes a radio receiver and a television receiver and means for receiving video signals via wireless communication networks.

The telematic device 2 further comprises an identification code, which uniquely identifies the device among all manufactured devices. Typically, the identification code is stored in a non-volatile read-only memory during the manufacturing process.

Finally, the telematic device comprises a module for reading an identity card, which the user inserts in order to use the radio mobile communication unit 5. The communication unit operates under the applicable telecommunication standards, such as GSM or UMTS. The communication unit uses an antenna 6 to communicate over a wireless network 8 with a service provider 3 also being equipped with an antenna 7 for reception and transmission.

The service provider 3 comprises a memory 9 for storing the identification codes of those telematic devices that have been reported as being used unauthorized.

Further, the service provider 3 comprises means for comparing the received identification codes for a match with the stored identification codes.

The method according to the present invention will now be explained in further detail with reference to FIG. 2, which illustrates in a schematic way the communication between the telematic device and the service provider over a wireless network.

As a first step, the telematic device requests any kind of online services, e.g. location-based services or off-board navigation data. In response thereto, the service provider requests the identification code of the telematic device in order to identify the subscriber. This is generally done in order to check the user's authorization to use the services and for billing purposes. In response thereto, the telematic device sends its identification code, which is compared at the service provider with the stored identification codes of those devices which have been reported as being used unauthorized.

In case a match is found, the service provider requests to send the position coordinates of the telematic device. In response to this request, the telematic device sends the position coordinates obtained from the GPS module.

All above-mentioned steps are carried out without any interaction needed by the user, such that the user is not aware that, e.g. his position coordinates are sent to the service provider.

In order not to make the unauthorized user of the telematic device suspicious, the service provider then delivers the requested services. Consequently, the unauthorized user does not become aware of the fact that his identification code has been checked and possibly determined as being one that belongs to a telematic device that has been reported as being used in an unauthorized manner. Moreover, because the position coordinates can be obtained at the service provider, this information can be used to direct police or security authorities to the unauthorized user.

Figure 2:
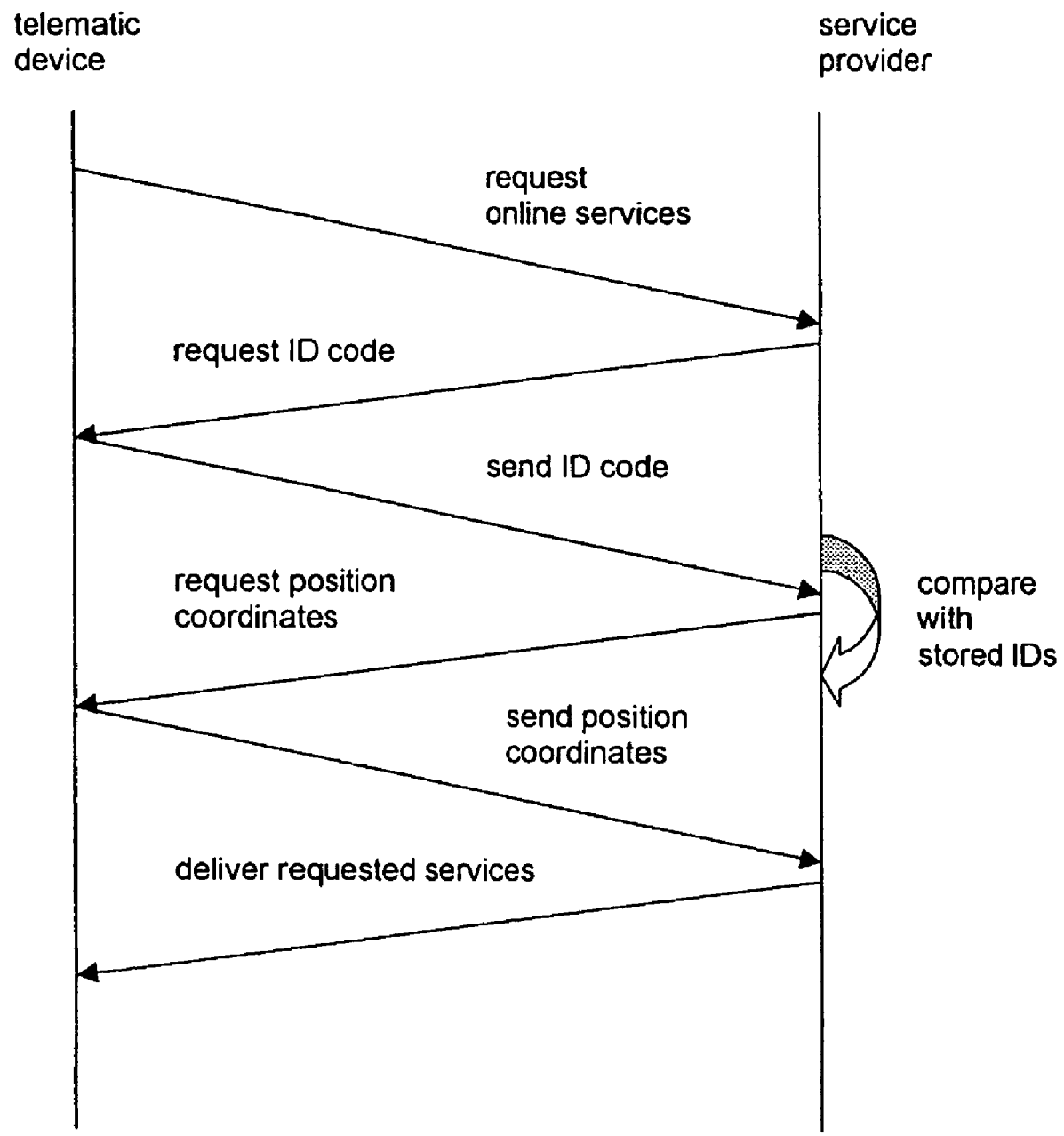
FIG. 2 a diagram illustrating the method according to the present invention, in particular illustrating the communication between the telematic device and the service provider.

According to an alternative embodiment to the method shown in FIG. 2, the identification code is sent without being previously requested from the service provider in response to a request to provide online services. In order to do so, the telematic device comprises an internal timer, which initiates the transmission of an identification code to the service provider in cyclic intervals, preferably once per day. In this way, it is ensured that even if no online services are requested, the service provider can at least on a daily basis determine whether the telematic device has been used in an unauthorized manner.

This cyclic transmission of the identification code may be disabled and enabled upon input of a security code into the telematic device. This allows flexibility for the user to decide whether he wants to put the telematic device in the cyclic transmission mode with enhanced security or whether it is sufficient that the identification code is transmitted when the telematic device requests online services.

Further, according to another preferred embodiment, a change of the identity card is the event which initiates the transmission of the identification code to the service provider for subsequent checking of a possible unauthorized use. The change of an identity card typically occurs when an unauthorized user tries to start operation of a telematic device. As mentioned before, it is important that all operational steps are carried out by an automatic routine without requiring interaction by the user in order that he does not become aware of the fact that his identification code is checked.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method of identifying on unauthorized use of a telematic device or a vehicle equipped therewith, the telematic device having an identification code, which is transmitted to a service provider, comprising:

storing at the service provider, the identification codes of those telematic devices which have been reported as being used unauthorized;

receiving at the service provider an on-line service request from a first telematic device having a first identification code and a second telematic device having a second identification code;

receiving the first and the second identification codes from the first and the second telematic devices in their ordinary operating routine, which comprises the on-line service request requested by an unauthorized user and a billing for the on-line service request, where the on-line service request with the telematic device is known to-the unauthorized user such that the unauthorized user can select and request on-line service;

comparing identification codes received at the service provider for a match with the stored identification codes;

comparing the first identification code received at the service provider for a match with the stored identification codes;

comparing the second identification code received at the service provider for a match with the stored identification codes;

identifying that a use of the first telematic device is authorized and a use of the second telematic device is unauthorized:

providing the requested service to both the first and the second telematic devices, even though the use of the second telematic device is unauthorized, to prevent an unauthorized user of the second telematic device from becoming aware that the second identification code is compared and that the use of the second telematic device is identified to be an unauthorized; and providing the requested service to the second telematic device, even though the second telematic device is manipulated by changing an identity card inserted by the unauthorized user to use radio mobile communication, and detecting the unauthorized use of the second telematic device by the identification code obtained through an ordinary operation routine of the second telematic device.

2. The method according to claim 1, further comprising the step of requesting by the service provider transmission of the present position coordinates of the telematic device when a match is found.

3. The method according to claim 2, wherein the position coordinates are determined at the telematic device using a global positioning system module and displayed at the service provider.

4. The method according to claim 1, wherein the communication between the telematic device and the service provider is carried out using a standard cellular communications unit.

5. The method according to claim 1, wherein the identification code is transmitted to the service provider when the change of the identity card providing access to the telematic device is detected.

6. The method according to claim 1, wherein the identification code is transmitted to the service provider in cyclic intervals and the cyclic intervals comprises once per day.

7. The method according to claim 6, wherein the cyclic transmission of the identification is disabled and enabled upon input of a security code into the telematic device.

8. The method according to claim 1, wherein all steps are carried out by an automatic operational routine at the telematic device without requiring interaction by a user.

9. The method according to claim 2, wherein the communication between the telematic device and the service provider is carried out using a standard cellular communications unit.

10. The method according to claim 3, wherein the communication between the telematic device and the service provider is carried out using a standard cellular communications unit.

11. The method according to claim 2, wherein the identification code is transmitted to the service provider when the change of the identity card providing access to the telematic device is detected.

12. The method according to claim 3, wherein the identification code is transmitted to the service provider when the change of the identity card providing access to the telematic device is detected.

13. The method according to claim 4, wherein the identification code is transmitted to the service provider when the change of the identity card providing access to the telematic device is detected.

14. The method according to claim 2, wherein the service provider initiates communication with the telematic devices when online services are requested by the telematic devices from the service provider.

15. The method according to claim 3, wherein the service provider initiates communication with the telematic devices when the identification codes are transmitted from those telematic devices in cyclic intervals.

16. The method according to claim 4, wherein the service provider initiates communication with the first and the second telematic devices when online services are requested from the service provider by the first telematic device and when the second identification code is received at the service provider in cyclic intervals.

17. The method according to claim 2, wherein first identification code is transmitted to the service provider in response to a request by the service provider.

18. The method according to claim 2, wherein the first identification code is transmitted to the service provider in cyclic intervals and the cyclic intervals comprises once per day.

19. The method according to claim 18, wherein the cyclic transmission of the first identification code is disabled and enabled upon input of a security code into the telematic device.

20. The method according to claim 2, wherein all steps are carried out by an automatic operational routine at the telematic device without requiring interaction by a user.

21. The method according to claim 3, wherein all steps are carried out by an automatic operational routine at the telematic device without requiring interaction by a user.

22. The method according to claim 4, wherein all steps are carried out by an automatic operational routine at the telematic device without requiring interaction by a user.

23. The method according to claim 5, wherein all steps are carried out by an automatic operational routine at the telematic device without requiring interaction by a user.

24. A telematic device comprising:
a memory storing an identification code;
a global positioning system module for determining position coordinates;
a mobile communication unit operating under applicable telecommunication standards and communicating with a service provider to transmit the identification code;
a module for reading an identity card inserted by a user to enable communication by the mobile telecommunication unit; and a mechanism for enabling/disabling cyclic transmission of the identification code to the service provider;

where independently of the unauthorized use of the telematic device, the mobile communication unit transmits the identification code in an ordinary operation routine of the telematic device and the ordinary operation routine comprises an on-line service request requested by an unauthorized user and a billing for the on-line service request, and where the on-line service request with the telematic device in the unauthorized use is known to the unauthorized user such that the unauthorized user can select and request on-line service; and where even if the telematic device is manipulated by changing the identity card inserted by the unauthorized user, the unauthorized use of the telematic device is detectable by the identification code of the telematic device obtained through the ordinary operation routine of the telematic device.

25. The telematic device according to claim 24, further comprising a standard cellular communications unit.

26. The telematic device according to claim 24, where the telematic device is resident to a vehicle.

27. The telematic device according to claim 24, where the mechanism further comprises means for inputting a security code for disabling/enabling the cyclic transmission of the identification code.

28. The telematic device according to claim 24, where the mobile communication unit receives location-based information, security information and entertainment services form the service provider.

29. The telematic device according to claim 24, further comprising a radio receiver and a television receiver and means for receiving video signals.

30. The telematic device according to claim 24, where all operations are carried out by an automatic operational routine at the telematic device without requiring interaction by a user.

31. A system for identifying unauthorized use of a telematic device or a vehicle equipped therewith, comprising:

a memory for storing the identification codes at the service provider of those telematic devices, which have been reported a being used unauthorized;

means for comparing identification codes received at the service provider for a match with the stored identification cedes; and a communication unit operable to receive a service request from a first telematic device having a first identification code and a second telematic device having a second identification code;

where the means for comparing operates to compare the first identification code and the second identification code for the match with the stored identification codes and the means for comparing identifies that a use of the first telematic device is authorized and a use of the second telematic device is unauthorized; and where the communication unit provides the requested service to both the first and second telematic devices, even though the use of the second telematic device is unauthorized, to prevent an unauthorized user of the second telematic device from becoming aware that the second identification code is compared for match with the stored identification codes and the use of the second telematic device is identified to be unauthorized; and where the telematic device comprising:

a memory storing an identification code;

a global positioning system module for determining position coordinates;

a mobile communication unit operating under applicable telecommunication standards and communicating with a service provider to transmit the identification code;

a module for reading an identity card inserted by a user to enable communication by the mobile telecommunication unit; and a mechanism for enabling/disabling cyclic transmission of the identification code to the service provider;

where independently of the unauthorized use of the telematic device, the mobile communication unit transmits the identification code in an ordinary operation routine of the telematic device and the ordinary operation routine comprises an on-line service request requested by an unauthorized user and a billing for the on-line service request where the on-line service request with the telematic device in the unauthorized use is known to the unauthorized user such that the unauthorized use can select and request on-line service; and where even if the telematic device is manipulated by changing the identity card inserted by the unauthorized user, the unauthorized use of the telematic device is detectable by the identification code of the telematic device obtained through the ordinary operation routine of the telematic device.

32. The system according to claim 31, where the service provider further comprises means for requesting the transmission of the present position coordinates from the telematic device.

33. The system according to claim 31, where all operations are carried out by an automatic operational routine at the telematic device without requiring interaction by a user.

* * * * *

UNITED STATES PATENT AND TRADEMARK OFFICE
CERTIFICATE OF CORRECTION

PATENT NO. : 7,688,197 B2  Page 1 of 1
APPLICATION NO. : 10/506092
DATED : March 30, 2010
INVENTOR(S) : Becker et al.

It is certified that error appears in the above-identified patent and that said Letters Patent is hereby corrected as shown below:

At column 2, line 54, "According to a further advantageous,..." should read "According to a further advantage,..."

At column 4, line 64, claim 1, "1. A method for identifying on unauthorized use..." should be changed to "1. A method for identifying an unauthorized use..."

At column 5, line 13, claim 1, "...the telematic device known to-the" should be changed to "...the telematic device known to the"

At column 7, line 43, claim 31, "reported a being used..." should be changed to "reported as being used..."

At column 7, line 46, claim 31, "...cedes..." should be changed to "...codes..."

Signed and Sealed this

Twenty-first Day of December, 2010

David J. Kappos
*Director of the United States Patent and Trademark Office*